Patented Feb. 24, 1942

2,273,891

UNITED STATES PATENT OFFICE 2,273,891

METHOD OF POLYMERIZING POLYMERIZABLE MATERIALS CONTAINING MORE THAN ONE POLYMERIZABLE GROUPING

Maxwell A. Pollack, Irving E. Muskat, and Franklin Strain, Akron, Ohio, assignors to Pittsburgh Plate Glass Company, Alleghany County, Pa., a corporation of Pennsylvania No Drawing. Application February 18, 1939, Serial No. 257,138

13 Claims. (Cl. 260—78)

This invention relates to methods of producing novel resinous products and to the novel materials resulting from such methods. It has been previously noted that many compounds which contain at least two polymerizable unsaturated groups which are unconjugated with respect to carbon including unsaturated esters of unsaturated acids, such as allyl methacrylate, polymerize to form insoluble, infusible products. Because of the insolubility and infusibility of these materials, however, they are exceedingly difficult to handle and have not been used extensively. Attempts to cast polymerize these materials are often unsuccessful due to the great shrinkage which occurs during polymerization, producing fractures in the product.

In addition, we have found that many of these compounds polymerize very slowly to form soft resinous products which are not sufficiently hard for many purposes. Thus, while it has been known that certain of these materials polymerize, the materials have not been regarded as having sufficient desirable properties to warrant their use in commercial processes.

In accordance with our invention, we have devised a process by which such materials may be used to produce a wide variety of products having desirable characteristics. In polymerizing an organic compound which contains two or more polymerizable unsaturated groups such as the unsaturated esters of the unsaturated acids, we have determined that desirable products may be secured by polymerizing the material in two stages. We have found that upon polymerization of an organic oxygen compound which contains two or more polymerizable groups, a fusible polymer is preliminarily formed. As polymerization proceeds in the usual manner, however, the polymer is converted into an infusible gel. Further polymerization of the gel may occur but it is often observed that products so produced, are not sufficiently plastic to permit permanent deformation and are soft. This is particularly true with compounds which polymerize slowly.

By polymerization in two stages, we have been able to secure shaped products of great hardness and transparency of any convenient form. In accordance with this process, the polymerization of the material is interrupted before the polymer becomes infusible. Thereafter, residual or unpolymerized monomer is substantially completely separated from the polymer. The fusible polymer thus formed is, in general, in the form of a powder or white plastic. It is then fused, melted, or otherwise treated to cause the discrete particles of polymer to merge or blend, whereby a substantially homogeneous polymer is secured. Thus fused polymer which may be of any convenient form is further polymerized to form a substantially insoluble or infusible polymer.

Very efficient results have been secured by treatment of the unsaturated alcohol esters of acrylic and α-substituted acrylic acids or the polyhydric alcohol polyesters of these acids or the corresponding amides thereof, such as allyl acrylate, allyl methacrylate, allyl chloroacrylate, methallyl acrylate, methallyl methacrylate, methallyl chloroacrylate, ethylallyl methacrylate, crotyl methacrylate, 2-chloroallyl acrylate, 2-chloroallyl methacrylate, oleyl methacrylate, vinyl acrylate, vinyl methacrylate, resorcinol dimethacrylate, glycol dimethacrylate, glycol diacrylate, glycerol di- or trimethacrylate or mixtures thereof, or polyglycol diacrylates, glycerol di- or triacrylate or the acrylic, methacrylic, or alpha-chloroacrylic esters of the higher polyhydric alcohols, such as sorbitol or mannitol wherein at least two of the hydroxyl groups are esterified with the above named acids. Additionally, hard solvent-resistant articles may be secured through use of the corresponding amides of the unsaturated acids, such as vinyl, allyl, methallyl, ethyl allyl, or oleyl acrylamides, methacrylamides or chloroacrylamides. Other materials containing two or more polymerizable groups such as vinyl allyl ether, diallyl ether, divinyl ketone, allyl styrene or substituted urea derivatives, such as diallyl urea, may be treated in a similar manner.

Other products may be secured by polymerization of other organic oxygen compounds which contain at least two polymerizable groups. For example, unsaturated aliphatic alcohol esters of unsaturated aliphatic acids, such as the unsaturated crotonate esters; allyl crotonate, crotyl crotonate, methallyl crotonate, oleyl crotonate, 2-chloroallyl crotonate, ethylallyl crotonate, or other unsaturated esters, such as allyl oleate, allyl itaconate, allyl propiolate, diallyl maleate, allyl ethyl maleate, ethyl methallyl maleate, methy allyl maleate, vinyl allyl maleate, divinyl maleate, or other mono- or polyester formed by esterification of maleic or fumaric acid or their substituted derivatives with an unsaturated alcohol or allyl citraconate, allyl fumarate, methallyl fumarate, oleyl fumarate, allyl cinnamate or the corresponding methallyl, ethyl allyl, or crotyl esters thereof, or the unsaturated polyesters of saturated polybasic acids and unsaturated monohydric alcohols such as diallyl oxalate, diallyl malonate, di- or triallyl citrate, diallyl tartrate, diallyl phthalate, diallyl carbonate, etc., or the corresponding methallyl or crotyl esters thereof may be used for this purpose. Similarly, the polyesters of polyhydric alcohols and monobasic unsaturated esters such as ethylene glycol dicinnamate, glycerol dicinnamate, glycerol dipropiolate, glycol dipropiolate, or the corresponding esters of the other glycols such as the propylene glycols, butylene glycols, polyglycols thereof or the higher alcohols such as sorbitol or mannitol, etc., may be polymerized in this manner. Other organic oxygen compounds which contain at least two polymerizable double bonds and are capable of polymerizing to a final form which is transparent, hard and substantially infusible and insoluble may be used. Thus, unsaturated polyethers of polyhydric alcohols, such as the diallyl, -methallyl, -oleyl or -crotyl ethers of glycols, such as ethylene, propylene, or butylene glycol or polyglycols, such as diethylene glycol, tetraethylene glycol, etc., or the di- or triallyl, methallyl, oleyl, or crotyl ethers of glycerol or the corresponding polyethers of the higher polyhydric alcohols, such as mannitol or sorbitol may be applied and polymerized in accordance with our invention. In addition, esters of inorganic acids, such as diallyl sulphate, di- or triallyl phosphate, di- or triallyl borate, di- or triallyl phosphite, polyallyl silicates or titanates, or similar esters may be polymerized by our process. Products of desirable characteristics may be secured by polymerization of derivatives of many of these materials such as the halogen or alkyl substituted derivatives of maleic or fumaric unsaturated esters having the following structural formula:

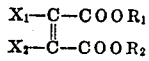

Where $R_1$ and $R_2$ are residues of monohydric alcohols at least one of which is unsaturated and $X_1$ and $X_2$ are hydrogen, halogen such as chlorine or bromine, or an organic aryl, aliphatic or araliphatic radicle such as the methyl, ethyl, propyl, amyl, cyclohexenyl, methylene, propylene radicles and the like. Thus, unsaturated esters of benzyl maleic acid, methyl allyl maleate, propyl allyl maleate, ethyl maleic acid, etc., may be treated in accordance with the present invention.

In order that a product of maximum surface hardness be produced, it is preferred to make use of compounds wherein the number carbon atoms in the molecule of the monomeric form is not excessive. Thus, polymeric allyl or methallyl methacrylate or chloroacrylate exhibits a greater resistance to wear and is harder than polymeric oleyl methacrylate. The trend toward softer products may be minimized as the number of polymerizable unsaturated groups in the composition increases. Thus, sorbitol hexamethacrylate polymerizes to form a product which exhibits greater hardness than does polymeric oleyl methacrylate. In general, it is preferred to make use of agents wherein the ratio of the number of carbon atoms in the molecule of monomer to the number of polymerizable olefinic or unsaturated groups does not exceed 15 and preferably materials wherein this ratio does not exceed 8 are made use of. In addition, it is found that most desirable products are secured through use of materials containing not in excess of 10 carbon atoms each in the alcohol radicles and in the acid radicles.

The method of securing the fusible polymer is dependent upon the nature of the material which is undergoing polymerization. In general, it is possible to secure the fusible material in substantial yields by polymerizing the monomer in a solution in which the fusible polymer is normally soluble. This polymer is generally soluble in the solvents which are capable of dissolving the usual thermoplastic vinylic type resins, such as methyl methacrylate. Thus, such solvents as acetone, dioxane, chloroform, toluene, benzene, carbon tetrachloride, methyl cellosolve acetate, phenyl cellosolve, dichlorethyl ether, xylene, tetralin, dibutyl phthalate, trichlorethylene, tetrachloroethane, etc., or mixtures of these solvents are found to be suitable.

In each case, the polymerization may be interrupted before the infusible product is produced. This may be accomplished by stopping polymerization as the mixture of monomer and polymer begins to grow viscous and before infusible gel formation occurs. In accordance with one illustrative method of interrupting polymerization, the polymer may be separated from the monomer by convenient methods, for example, by the addition of a compound in which the polymers are normally insoluble, such as methyl or ethyl alcohol, petroleum ether, water, ethylene glycol, etc. This process permits the isolation of the fusible polymer in a substantially pure state and is particularly adapted to use when the material is polymerized in solution. Polymerization may also be halted by lowering the temperature of the reaction mixture to a suitable degree, for example, to room temperature or below.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before polymerization has been initiated. When the fusible polymer is produced in solution, it may be recovered by methods other than by treatment with a nonsolvent, such as by slow evaporation or distillation of the solvent. Fusible cast thermoplastic polymers which may be machined, cut, bent or otherwise worked into desirable forms may be obtained in this manner. After final shaping, the products may be completely hardened and rendered infusible by suitable methods hereinafter more fully set forth.

In polymerizing in solution, it has been found that the yield of fusible polymer appears to be dependent to a great extent upon the concentration of the monomer in the solution undergoing polymerization. When very concentrated solutions (40-50 percent by weight), containing a large quantity of a monomeric acrylate ester of an unsaturated or a polyhydric alcohol such as allyl or methallyl methacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer upward of 75 percent of the theoretical may be secured. Accordingly, when dealing with unsaturated acrylates, such as allyl acrylate, it is preferred to treat solutions having a monomer concentration below 40 percent by weight.

The yield of fusible polymer appears to be increased by treating the solution at increased temperatures and increased catalyst concentrations. Thus, substantially greater yields may be secured by polymerizing ethylene glycol dimethacrylate solution at 100° C., or above than may be secured at 60° C. Catalyst concentrations up to 5 percent or more may be used in some cases. In general, conditions favoring the formation of lower molecular weight polymers appear to result in increased yields of fusible products.

The following examples illustrate the preparation of these fusible polymers in solvents.

Example I

One part by weight of allyl methacrylate was heated with 0.07 part by weight of benzoyl peroxide and 5.6 parts by weight of acetone under a reflux condenser for one and one-half hours. The resulting solution was carefully poured, with stirring, into 100 parts of methanol. A white precipitate which was fusible and soluble in acetone was formed. When heated under slight pressure at 90° C. this material fused and rapidly converted to an insoluble and infusible form.

Example II 55 parts by weight of ethylene glycol dichloracrylate were heated with 3 parts by weight of benzoyl peroxide and 350 parts by weight of acetone at a temperature of 60° C. for one hour. At this time, 300 parts of methanol were added to produce turbidity and the resulting mixture was poured slowly, with stirring, into 1600 parts of methanol. The white voluminous precipitate thus formed was filtered and dried, and was soluble in acetone and chloroform. Upon heating, the polymer softened at 100° C. and rapidly converted into an infusible, insoluble transparent material.

Example III

One part by weight of glycerol dimethacrylate was heated with 0.07 part by weight of benzoyl peroxide and 5.0 parts by weight of acetone under a reflux condensor for one and one-half hours. The resulting solution was carefully poured, with stirring, into 100 parts of methanol. A white precipitate which was fusible and soluble in acetone was formed. This material began to soften when heated at 100° C. and was rapidly converted into a hard brittle product.

Example IV

One part by weight of ethylene glycol dimethacrylate was heated with 0.07 part by weight of benzoyl peroxide and 5.6 parts by weight of acetone under a reflux condenser for one and one-half hours. The resulting solution was carefully poured, with stirring into 100 parts of methanol. A white precipitate which was fusible and soluble in acetone was formed. This material began to soften when heated at 90° C. and was rapidly converted into a hard brittle product.

Example V 55 parts by weight of glycerol triacrylate were heated with 3 parts by weight of benzoyl peroxide and 350 parts by weight of acetone at a temperature of 60° C. for one hour. At this time, methanol was added to the point of turbidity, and the resulting mixture was poured slowly, with stirring, into 1600 parts of methanol. The white voluminous precipitate thus formed was filtered and dried, and was soluble in acetone and chloroform. Upon heating, the polymer softened at 80–85° C. and then became infusible and insoluble with further heating.

It is also possible to produce the fusible polymer in accordance with our invention without resorting to the use of solutions of the monomer. Thus, the monomer may be polymerized directly by use of heat and/or light, preferably in the presence of catalysts such as air, ozone, oxygen peroxides and the like, and interrupting polymerization at the proper time. Since the polymerization proceeds without undue rapidity with many of these materials, the reaction may be stopped before the infusible gel state is reached without difficulty either by use of inhibitors or by cooling as hereinbefore mentioned.

The fusible polymer so produced may be molded to any desired shape and subsequently cured to the infusible state. However, it is found that if considerable monomer is retained by the polymer, upon curing, considerable difficulty is encountered in securing complete or substantially complete polymerization of the residual monomer.

We have found that it is desirable to remove substantially all the monomer prior to curing the polymer to its infusible state. In accordance with one convenient method, the monomer may be distilled from the polymer under conditions whereby the possibility of further polymerization is minimized, for example, by distillation in a vacuum, preferably at low temperatures, or in the presence of added inhibitors. Similarly the monomer may be extracted with a solvent in which the polymer is insoluble such as methyl or ethyl alcohol. Additionally, the polymer and monomer may be separated by dissolving the product in a solvent for both monomer and polymers and adding a nonsolvent to precipitate the fusible polymer.

The following examples are illustrative of this phase of our invention.

Example VI

A quantity of monomeric allyl crotonate was heated in a stream of air at a temperature of 150–160° C. until the solution became viscous. The liquid was then cooled and subjected to distillation at an absolute pressure of one millimeter of mercury until a mass which was solid at ordinary temperatures remained. This material was readily fused by heating to a temperature of 100° C. in a mold and was further cured at a pressure of 1500 pounds per square inch and a temperature of 150° C. for one hour. The article produced was hard, insoluble, clear, transparent and free from fractures.

Example VII

A quantity of dimethallyl maleate was heated with one percent by weight of benzoyl peroxide at 100° C. for 15 minutes after which the product became viscous. The product was then cooled to room temperature and the polymer was recovered by dissolving in acetone and precipitating the polymer as in Example I. This polymer was placed with 10 percent by weight of benzoyl peroxide and heated to a temperature of 170° C. and a pressure of 2000 pounds per square inch for 3 hours. The product was clear, hard and insoluble.

Example VIII

A quantity of dioleyl maleate containing 5 percent benzoyl peroxide was heated to 120° C. until the solution became viscous. The product was then dissolved in acetone and the fusible polymer recovered by precipitation as in Example I. This polymer was placed in a mold with 5 percent benzoyl peroxide and heated to 150° C. at a pressure of 1000 pounds per square inch for 10 hours. The product obtained was clear, flexible, insoluble and infusible.

*Example IX*

A quantity of monomeric allyl crotonate was heated in a stream of air at a temperature of 150-160° C. until the liquid began to get viscous. The liquid was then dissolved in acetone and the fusible polymer was precipitated with methyl alcohol in the manner described in Example I. The precipitated polymer was recovered as a white gummy mass. This mass was dissolved in acetone and reprecipitated by pouring the solution into water. The resulting precipitate could be powdered readily when dry. This acetone-soluble powder fused readily at a temperature of 80° C.

The method of preparing the fusible polymer by direct polymerization of the monomer is particularly adapted to the treatment of those materials which polymerize without undue rapidity such as allyl crotonate or other unsaturated crotonates or glycol dicrotonate or similar polycrotonate or the corresponding itaconates, oxalates, maleates, citrates, phthalates, etc. In the case of materials which polymerize with greater rapidity, such as the acrylates, methacrylates, or chloroacrylates, recovery of substantial yields of the fusible material by direct polymerization is exceedingly difficult, and only minor yields are generally obtained. Accordingly, it is preferred to treat such polymers in the presence of a solvent for the polymer as previously described.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften or flow upon heating under atmospheric pressure. They are precipitated from solutions by use of nonsolvents as a white amorphous powder. The exact softening or flow points of the products are dependent to a great degree upon the temperature, catalyst concentration and monomer concentration of the solution undergoing polymerization. All of these products appear to be easily molded into convenient shapes.

The time required for polymerization to the fusible state is dependent upon the nature of the material, the catalyst concentration and the temperature of polymerization. In the case of the acrylate esters polymerization in solution for a period of 4 hours is found to be satisfactory when the temperature is 60° C. This period must be materially shortened with rising temperature and at 100° C. it is found that the fusible polymer must be recovered within a few minutes after the polymerization reaction is initiated. Similar variations of time of polymerization in accordance with the temperature is found necessary in treating other polymerizable materials. In any case, however, the polymer is preferably recovered by interrupting polymerization as the monomer undergoing treatment grows viscous since after solidification thereof the polymer may be found to be substantially insoluble.

In accordance with our invention, we have found that upon subjection of these polymers to heating at temperatures somewhat above the softening point thereof, for a sufficient period of time, they are converted into infusible, insoluble, transparent, hard and wear-resistant products. Thus, while the fusible polymer melts or flows upon heating under non-polymerizing conditions and at atmospheric pressure, the converted infusible polymer retains its shape or contour and does not flow under such conditions, and in general, can not be molded. This conversion appears to occur in the absence of catalysts. It may be assisted, however, by the incorporation of usual polymerization catalysts, such as oxygen, ozone, air, peroxides, such as hydrogen peroxide, or benzoyl peroxide, basic or acidic catalysts, light, etc. By use of catalysts, it is found that the conversion of these products to the infusible state may be secured at lower temperatures. The application of super-atmospheric pressure has been found to assist the transformation to the insoluble and infusible stage.

The properties of the products so produced are dependent to a degree upon the conditions under which they are rendered infusible. Thus, extremely hard, somewhat brittle products may be prepared by effecting the treatment at relatively high temperatures or under high pressures. On the other hand, somewhat stronger, less brittle materials may be secured when the treatment is conducted under moderate pressures and temperatures sufficiently low to permit a slow conversion of the fusible polymer into its infusible stage through a period in which it is substantially completely molten. In any event, it is considered desirable to effect the final stages of curing at high temperatures in order to secure maximum strength.

By operation, in accordance with the present invention, it is thus possible to form a molded article from the fusible polymer such as the fusible polymeric glycol or glycerol polymethacrylates or polychloroacrylates, or other products previously referred to, and therefore to render the molded products insoluble and infusible by heat. In this manner, we are able to prepare transparent, hard, infusible, molded products which have many of the desirable properties of the conventionally known thermoplastic resins as well. By proper regulation of the pressure and temperature, the fusible polymer may be extruded under such conditions that it becomes infusible as it leaves the extrusion die.

Since the fusible polymer is a true thermoplastic, it often may be kept in the molten state for an indefinite period, particularly by incorporating an inhibitor such as hydroquinone whereby conversion to the infusible state may be prevented. It is thus possible to form cast or molded products by melting a quantity of the fusible polymer with a quantity of polymerization inhibitor in a suitable mold. These products may then be converted to the infusible state by introduction of catalysts. This may be done, for example, by heating the molded or cast material in a molten or solid state in the presence of air, peroxides, etc. In accordance with a further modification, the cast or molded thermoplastic polymer may be coated with a solution of catalyst or a film of monomer or a solution of fusible polymer which contains high catalyst concentration may be applied to the surface of the molded product. This coated product may be subjected to polymerization with heat, pressure, and/or ultra-violet light to convert it to the infusible state.

A large number of inert substances may be incorporated with the fusible polymer before subjecting the molding condition. Suitable for such purposes are: fillers, such as wood-flour, mica, cotton flock, etc., plasticizers, such as dibutyl phthalate, dicyclohexyl phthalate, triacetin, tricresyl phosphate, natural or synthetic resins, pigments, including titanium dioxide, carbon black, chromic oxide, lead chromate, etc., and organic dyestuffs, such as methylene blue, methyl orange, etc.

If desired, similar products may be made from suitable copolymers, for example, of the olefinic esters of maleic or fumaric acids, may be copolymerized with the saturated esters thereof or with other compatible polymerizable materials such as acrylates or alpha-substituted acrylates for example, methyl methacrylate, to form desirable products in accordance with our invention. In such a case, however, it is preferred to maintain a preponderance of the maleic ester in order to insure the production of a product which is capable of forming both fusible and infusible polymers. In general it is desired to maintain a concentration of unsaturated maleate above 35-40 percent of the total polymerizable material. In some cases, it is found that infusible products which are stronger and less brittle than the single polymer may be produced in this manner.

These resins are also suitable for many uses in the field of laminated products. For example, products of great strength, elasticity and adherence may be secured by converting fusible glycol, or glycerol polymethacrylate, polychloroacrylate, allyl crotonate, maleate, etc., into the infusible state in the presence of a substantial amount of a compatible softening agent such as dibutyl phthalate.

It has been found that these products are applicable for impregnation purposes. Thus, leather, paper, wood or other comparatively porous substances may be steeped in a solution of the fusible polymer or a molten body thereof, and then heated alone, under pressure, or in the presence of catalysts to convert the absorbed polymer to the insoluble, infusible form. Greatly improved products, particularly in regard to strength, water-proofing, and electrical properties are obtained.

The following examples illustrate the conversion of the fusible resin into the infusible form:

*Example X*

To parts of fusible allyl methacrylate polymer, prepared in accordance with Example I, was heated at 150° C. under a pressure of 5000 pounds per square inch for one-half hour and a clear infusible, insoluble sheet was produced.

*Example XI*

A quantity of diallyl phthalate was prepared by heating a mixture of allyl alcohol and phthalic anhydride, which contained allyl alcohol in amount slightly in excess of the theoretical amount required for diallyl phthalate, to a temperature of 90-95° C. in the presence of 2 percent para toluenesulfonic acid for 15 hours. The mixture was washed with 0.1 N sodium hydroxide solution to remove acid and unreacted material and the diallyl phthalate was recovered by distillation at a temperature of 170° C. and a pressure of 6 millimeters of mercury.

One part by weight of diallyl phthalate was heated at 150° C. for two and one-half hours and was then dissolved in two parts by weight of acetone. Methylalcohol was added to the solution in an amount required to completely precipitate the polymer as a white powder. A quantity of the white powder was placed in a mold and heated to a temperature of 150° C. under a pressure of 1000 pounds per square inch for 4 hours. A hard, clear, transparent, insoluble sheet was thereby obtained.

*Example XII*

A quantity of ethyl allyl maleate was heated with one percent benzoyl peroxide at 130° C. for 15 minutes when the product began to grow viscous, heating was then discontinued and sufficient methyl alcohol was added to completely precipitate the polymer. The polymer was then placed in a mold with 10 percent by weight of dibutyl phthalate and heated to 150° C. at a pressure of 1000 pounds per square inch for three hours. A hard, clear, flexible, transparent sheet was thus secured.

*Example XIII*

Two parts of fusible ethylene glycol dichloroacrylate polymer, prepared as in Example II, was molded at 140° C., under pressure of 2000 pounds per square inch for one hour. The product obtained was hard, clear and unaffected by solvents or heat to the point of pyrolytic decomposition.

*Example XIV*

Two parts of the thermoplastic form of ethylene glycol diacrylate polymer was heated in a mold at 140° C., under a pressure of 3000 pounds per square inch for one hour. The resulting product was hard, clear and unaffected by solvents or heat to the point of pyrolytic decomposition.

*Example XV*

45 grams (0.5 mole) of anhydrous oxalic acid, 116 grams (2.0 moles) of allyl alcohol, and 3.2 grams of p-toluenesulfonic acid were heated together at 130-140° C. for 22 hours. The water and excess alcohol were then removed by slow distillation. The diallyl oxalate was then distilled at a temperature of 106-107° C., under a pressure of 6 mm. of mercury.

A sample containing 5 percent by weight of benzoyl peroxide was heated in a closed tube at 150° C. for 35 hours at which time the viscous solution was poured into methyl alcohol to recover the fusible polymer. The fusible polymer was heated in a mold with 5 percent benzoyl peroxide at a temperature of 150° C. for 3 hours and a flexible, transparent sheet was produced.

*Example XVI*

A quantity of dimethallyl oxalate was heated with 2 percent benzoyl peroxide to a temperature of 165° C. for 2 days, after which the solution became viscous. The fusible polymer was recovered by dissolving the mixture in acetone and precipitating with methyl alcohol as in Example I. The polymer was soluble in acetone, dioxane, phenyl cellosolve acetate and xylene. Upon heating to 150° C. the polymer fused. A quantity of the polymer was placed in a mold and heated to 170° C., under a pressure of 1000 pounds per square inch for 4 hours and a hard, insoluble, brittle sheet was obtained.

Example XVII 650 parts by weight of cinnamyl chloride was heated with 90 parts by weight of glycerol and 400 parts by weight of quinoline to a temperature of 50° C. for 12 hours. The mixture was then washed with water and then 0.1 N sodium hydroxide solution and was then distilled at an absolute pressure of 4 mm. of mercury. The molecular weight of the distillate was approximately that of glycerol tricinnamate. A quantity of this material was heated with 3 percent by weight of benzoyl peroxide at a temperature of 190° C. for 5 hours after which the solution was mixed with acetone and the fusible polymer recovered by means of methyl alcohol as in Example I. This polymer was soluble in dioxane, acetone and phenyl cellosolve acetate. When a quantity was placed in a mold and heated to 200° C. at a pressure of 2000 pounds per square inch, a transparent flexible insoluble sheet was secured.

The polymers which we have prepared are capable of numerous uses such as in lacquers, or other coating compositions, molded articles, safety glass. etc. Where the composition is used for coating, it may be applied in solution or in solid form, either alone or in combination with natural or synthetic drying oils or resins and the like, the solvent removed and the coated article baked to render the surface infusible. In this manner, it is possible to surface other polymers which are less resistant to the action of solvents or of heat. When a coating of the fusible polymer of the polyhydric alcohol polyester of acrylic or alpha-substituted acrylic acids such as glycol or glycerol methacrylate is deposited upon polymerized methyl methacrylate or similar polymer and the solvent removed, a coherent surface thereof is formed. Upon heating the coated article to suitable temperatures, this surface may be made transparent, hard and infusible.

Being of the thermosetting type, these resins do not exhibit the phenomenon of "cold flow," and are thus especially desirable for such uses as airplane windshields, where the pressure differences have been found to bow thermoplastic glass substitutes, particularly at the higher altitudes. Coatings may be applied to metal, glass, wood, synthetic resins, etc., surfaces by extrusion of the heated fusible polymer directly on the suitably-prepared surface. In similar manner, the surface may be heated and the polymer applied in powdered form, whereupon fusion occurs first to give a smooth, homogeneous film which may then be heat-hardened.

The process may also be extended to the production of mixed polymers or copolymers. Thus, the fusible polymer prepared in accordance with my invention may be mixed with other monomers or polymers such as the monomer or polymer of methyl methacrylate, methyl chloroacrylate, vinyl acetate, vinyl chloride, styrene, etc., and the mixture subjected to conditions of polymerization.

Although the present invention has been described with reference to the specific details of certain embodiments thereof, it is not intended that such details shall be regarded as limitations upon the scope of this invention except insofar as included in the accompanying claims.

We claim:

1. In a method of preparing a substantially infusible insoluble polymer the steps which comprise polymerizing an organic oxygen compound which contains at least two polymerizable unsaturated groups which are unconjugated with respect to carbon, interrupting polymerization after substantial polymerization has occurred but before the polymer is converted to a gel, substantially completely separating residual monomer from the resulting fusible polymer before the polymer is polymerized to an infusible state, subjecting the resulting polymer to a temperature and pressure sufficient to insure the existence of the polymer in a fused state, and continuing polymerization of the fused polymer for a time sufficient to convert the polymer into a substantially infusible and insoluble state.

2. The process of claim 1 wherein the compound is an unsaturated alcohol polyester of a polybasic acid.

3. The process of claim 1 wherein the compound is an allyl ester of a polybasic acid.

4. The process of claim 1 wherein the compound is an unsaturated alcohol ester of maleic acid.

5. The process of claim 1 wherein the compound is diallyl maleate.

6. The process of claim 1 wherein the fused polymer is polymerized in the presence of polymerization catalyst.

7. The process of claim 1 wherein the compound is an ester of an unsaturated alcohol containing no more than 10 carbon atoms and an acid containing no more than 10 carbon atoms.

8. The process of claim 1 wherein the polymer is fused in the presence of a polymerization inhibitor.

9. In a method of preparing a substantially infusible insoluble polymer the steps which comprise polymerizing an unsaturated alcohol polyester of a polybasic acid which contains at least two polymerizable unsaturated groups, interrupting polymerization after substantial polymerization has occurred but before the polymer is converted to a gel, substantially completely separating residual monomer from the resulting fusible polymer before the polymer is polymerized to an infusible state, subjecting the resulting polymer to a temperature and pressure sufficient to fuse the polymer and continuing polymerization of the fused polymer in the presence of a polymerization catalyst for a time sufficient to convert the polymer into a substantially infusible and insoluble state.

10. The process of claim 1 wherein the compound is an ester of methallyl alcohol.

11. The process of claim 1 wherein the compound is a methallyl ester of maleic acid.

12. The process of claim 1 wherein the compound is an oleyl ester of a polybasic acid.

13. The process of claim 1 wherein the compound is an oleyl ester of maleic acid.

MAXWELL A. POLLACK.
IRVING E. MUSKAT.
FRANKLIN STRAIN.